US012560093B2

(12) United States Patent
Goyon et al.

(10) Patent No.: US 12,560,093 B2
(45) Date of Patent: Feb. 24, 2026

(54) FOIL FOR A TURBOMACHINE ROTATING BLADE, ASSEMBLY FOR A TURBOMACHINE ROTOR, AND TURBOMACHINE

(71) Applicant: SAFRAN AIRCRAFT ENGINES, Paris (FR)

(72) Inventors: Vincent Goyon, Moissy Cramayel (FR); Pierre Marie Mulheim, Moissy Cramayel (FR); Arnaud Martine, Moissy Cramayel (FR); Antoine Giguet, Moissy Cramayel (FR); Nicolas Daniel Delaporte, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/552,017

(22) PCT Filed: Mar. 22, 2022

(86) PCT No.: PCT/FR2022/050524
§ 371 (c)(1),
(2) Date: Oct. 19, 2023

(87) PCT Pub. No.: WO2022/208000
PCT Pub. Date: Oct. 6, 2022

(65) Prior Publication Data
US 2024/0200460 A1 Jun. 20, 2024

(30) Foreign Application Priority Data
Apr. 1, 2021 (FR) ........................................ 2103391

(51) Int. Cl.
*F01D 5/30* (2006.01)

(52) U.S. Cl.
CPC ........ *F01D 5/3015* (2013.01); *F05D 2250/75* (2013.01); *F05D 2260/38* (2013.01)

(58) Field of Classification Search
CPC ...... F01D 5/3015; F01D 5/323; F01D 5/3092; F05D 2250/75; F05D 2260/38; Y02T 50/60
See application file for complete search history.

(56) References Cited

U.S. PATENT DOCUMENTS 2,847,187 A * 8/1958 Murphy .................. F01D 5/323 29/451
2,928,651 A * 3/1960 Turnbull ................. F01D 5/323 416/221

(Continued)

FOREIGN PATENT DOCUMENTS

FR 2 921 409 A1 3/2009

OTHER PUBLICATIONS

International Search Report as issued in International Patent Application No. PCT/FR2022/050524, dated May 12, 2022.

*Primary Examiner* — Chelsea E Stinson
*Assistant Examiner* — Eric A Lange
(74) *Attorney, Agent, or Firm* — Pillsbury Winthrop Shaw Pittman LLP

(57) ABSTRACT

A foil for a rotating blade of a turbomachine, configured to be mounted to a blade root of the rotating blade and including an overall U-shaped cross-section formed by two lateral legs connected through a lower surface, the lower surface covering a lower face of the blade root, the lateral legs each covering at least part of two lateral flanks of the blade root; and a blocking system for prohibiting at least some of relative movements between the blade root and the foil, the blocking system including at least one oblique tab, partially cut out of a lower surface of the foil and forming, (Continued)

A

B with respect to the lower surface of the foil, a tilted plane protrusion able to be inserted into a housing formed in a lower face of the blade root.

10 Claims, 4 Drawing Sheets

(56) References Cited

U.S. PATENT DOCUMENTS

| | | | | |
|---|---|---|---|---|
| 3,653,781 | A * | 4/1972 | Cooper | F01D 5/323 416/221 |
| 6,109,877 | A * | 8/2000 | Gekht | F01D 5/323 416/207 |
| 2004/0062653 | A1 * | 4/2004 | Di Paola | F01D 5/323 416/221 |
| 2009/0016890 | A1 * | 1/2009 | Douguet | F01D 5/3007 416/219 R |
| 2013/0259691 | A1 * | 10/2013 | Liu | F01D 5/225 29/889.7 |

* cited by examiner

A

B

FOIL FOR A TURBOMACHINE ROTATING BLADE, ASSEMBLY FOR A TURBOMACHINE ROTOR, AND TURBOMACHINE

CROSS-REFERENCE TO RELATED APPLICATIONS

This application is the U.S. National Stage of PCT/FR2022/050524, filed Mar. 22, 2022, which in turn claims priority to French patent application number 2103391 filed Apr. 1, 2021. The content of these applications are incorporated herein by reference in their entireties.

TECHNICAL FIELD OF THE INVENTION

The present invention relates to a foil for a turbomachine rotor blade. It also relates to an assembly for rotor including such a foil mounted to a blade root and to a turbomachine equipped with at least one such assembly.

The invention finds applications in the field of aeronautics and, in particular, in the field of turbomachine rotors to increase the service life of said rotors.

TECHNOLOGICAL BACKGROUND OF THE INVENTION

It is known in aeronautics that a rotor blade 10 ("aube" in French language), one example of which is represented in FIG. 1, comprises a vane 12 ("pale" in French language) provided, in its lower part, with a platform 11 from which a root 20 to be inserted into a cavity formed in the external periphery of a rotor disc radially extends. The root 20 of the rotor blade 10—also known as the rotating blade—is held radially in the cavity of the disc by shape cooperation between said root, which is generally dovetail-shaped, and the cavity, which is generally alveolus-shaped. At the upper part, the vane 12 is provided with a heel 13 to be disposed edge to edge with the heel of the adjacent rotating blades so as to form a rotating circumferential rim delimiting a surface of revolution about the axis of rotation XX of the disc.

During operation of the rotor, contact between the blade roots, for example made of titanium aluminide, and the disc, generally made of a nickel-based alloy, leads to premature wear of the blade roots. But significant wear of the blade roots can cause the heels of the rotating blades to overlap or even disengage from each other and thus generate a loss of contact between the heels and/or the start of a crack in the contact zone of the blade root, leading subsequently to the breakage of the blade root with a potential release of the blade into the turbomachine stream.

In order to limit wear of the blade roots and the disc cavities, it is known to place a contact piece, called a foil and referenced 30, at the contact interfaces, commonly referred to as seats, between the blade roots and the disc cavities. The foil 30, integral with the blade root 20 and in contact with the disc, takes up most of the energy dissipated by friction in the contact between said blade root and the disc, thereby limiting wear on the blade root.

FIG. 2 represents, in an enlarged view, the blade root 20 of the rotating blade 10 of FIG. 1, around which a conventional foil 30 is mounted. One example of this conventional foil 30 is represented in a perspective view in FIG. 3.

As can be seen in FIGS. 2 and 3, the foil 30 includes an overall U-shaped section formed by two lateral legs 32 for covering the lateral flanks 22 of the root 20 of the rotating blade 10 and holding the foil 30 on the root 20. The foil 30 also includes a base 31, also called the lower surface of the foil, which connects the lateral legs 32 together and covers the lower face 21 of the root 20.

In order to prevent the foil 30 from disengaging from the root 20, the base 31 of the foil comprises radial tabs 33, 34 bearing against the upstream 23 and downstream 24 faces of the root 20 of the blade. The radial tabs 33, 34 are strips cut out at the end of the base 31 and radially folded along the upstream and downstream faces 23, 24 of the root 20. These radial tabs 33, 34 extend over a greater or lesser width, between the lateral legs 32 of the foil, and form stops which make it possible to block relative axial movements between the root 20 and the foil 30.

However, despite the presence of these radial tabs, turbomachine maintenance operators have noticed that the foils tend to move axially, which damages the radial tabs and even sever them. As a result of their radial folding during the manufacturing phase and/or their unfolding during the assembly phase, the radial tabs are weakened and the friction generated by the repeated axial displacement of the foils has the effect of severing them. Once the radial tabs are broken, the foils can become partially or even totally disengaged from the blade roots, requiring the rotor to be removed for repair. Removing and repairing the rotor involves significant repair costs (parts and labour) and downtime for the turbomachine.

There is therefore a real need for a foil that is more robust and more resistant to friction.

SUMMARY OF THE INVENTION

In response to the problems discussed above concerning robustness and friction resistance of foils, the applicant provides a foil for a rotating blade, equipped with an oblique tab configured to be inserted into an housing in the lower face of the blade root.

According to a first aspect, the invention relates to a foil for a rotating blade of a turbomachine, configured to be mounted to a root of said rotating blade and comprising blocking means for prohibiting at least some of the relative movements between the blade root and said foil. This foil is characterised in that the blocking means include at least one oblique tab, partially cut out of a lower surface of the foil and forming, with respect to said lower surface of the foil, a protrusion in a tilted plane able to be inserted into a housing formed in a lower face of the blade root.

This foil includes an overall U-shaped section formed by two lateral legs connected through a lower surface, the lower surface covering a lower face of the blade root, the lateral legs each covering at least part of two lateral flanks of the blade root.

The oblique tab of the foil according to the invention has the advantage, on the one hand, of being folded only once during manufacture or assembly of the foil, which prevents it from becoming brittle. This oblique tab has the further advantage of being substantially parallel to the direction of forces and therefore of being able to withstand these forces during the relative movements between the blade root and the foil, which ensures it has a longer service life. It also has the advantage of not hindering operation of the blade because it is implemented on the lower face of the blade root, which is a non-functional face of said blade root.

The use of a foil according to the invention in a turbomachine makes it possible to limit the number of engine removals, to reduce the number of parts to be changed during an engine removal and, therefore, to reduce maintenance costs of the turbomachine. It also makes it possible to increase service life of turbomachines and improve flight safety.

In the present application, the terms "lower", "upper" and "outer" are interpreted with reference to the position of a part or surface in relation to the axis of rotation of the turbomachine, a lower surface being closer to the axis of rotation than an external or outer surface. The term "lateral" is interpreted as "which is located on the sides of a part which extends radially" along an axis perpendicular to the axis of rotation XX. The term "axial" is to be interpreted as "along the direction of the axis of rotation" and the term "radial" as "along a direction perpendicular to the axis of rotation" or "along the direction of a radius of the blade rim". The terms "upstream" and "downstream" will be interpreted with reference to the flow direction of the air stream in the turbomachine.

Further to the characteristics just discussed in the preceding paragraph, the foil according to one aspect of the invention may have one or more additional characteristics from among the following, considered individually or according to any technically possible combinations:

- the oblique tab includes free edges, detached from the lower surface of the foil, and a non-free edge attached to said lower surface.
- The tilted plane formed by the oblique tab extends from an upstream to downstream direction.
- The oblique tab is at least partially rectangular in shape and is tilted, relative to the lower surface of the foil, at an angle of less than 45°.
- The oblique tab is tilted, relative to the lower surface of the foil, at an angle of between approximately 10° and 25°.
- The oblique tab has the shape of a flat strip, shaped by folding its non-free edge.
- The oblique tab has the shape of a lamella with an at least partially curved profile, formed by drawing.

A second aspect of the invention relates to an assembly for a turbomachine rotor, including a rotating blade configured so as to be rotatably rotating about an axis of rotation and comprising a vane radially extending between a blade heel and a blade root, said blade root comprising a lower face extending in a plane parallel to the axis of rotation. The assembly is characterised in that it includes a foil as defined above and mounted at least partially around the blade root, the lower face of the blade root including a recess forming a housing for the oblique tab of the foil.

According to some embodiments, the blade root is configured so as to be mounted in an alveolus of a disc of the turbomachine and the assembly is characterised in that a height between the lower surface of the foil and the free edge of the oblique tab furthest from said lower surface is greater than a clearance between the lower face of the blade root and a bottom of the alveolus of the disc.

According to some embodiments, the recess of the blade root includes an oblique upper wall forming a tilted plane substantially parallel to the tilted plane formed by the oblique tab.

A third aspect of the invention relates to a turbomachine, characterised in that it includes at least one rotor assembly as defined above.

BRIEF DESCRIPTION OF THE FIGURES

Further advantages and characteristics of the invention will become apparent upon reading the following description, illustrated by the figures in which.

DETAILED DESCRIPTION

An exemplary embodiment of a foil for a rotating blade, configured to be more robust and more resistant to friction than conventional foils, is described in detail below, with reference to the appended drawings. This example illustrates the characteristics and advantages of the invention. However, it is reminded that the invention is not limited to this example.

In the figures, identical elements are marked by identical references. For reasons of legibility of the figures, the size scales between the elements represented are not respected.

Figure 1:
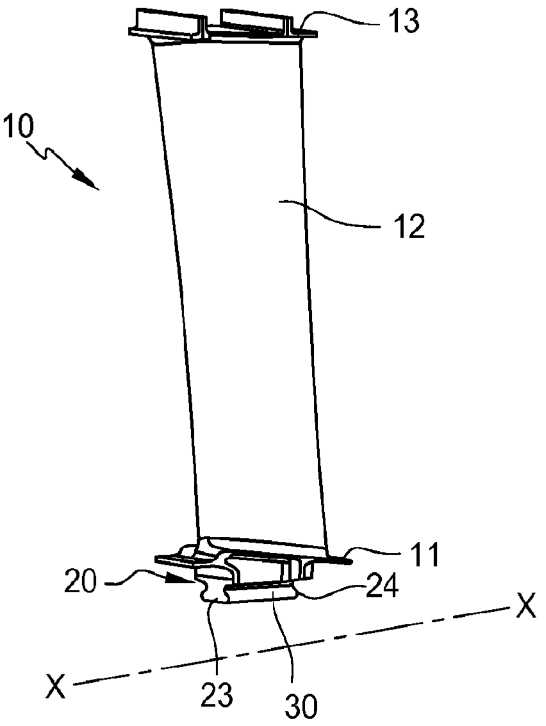
FIG. 1, already described, represents a schematic perspective view of a turbomachine rotating blade according to the state of the art.
Figure 2:
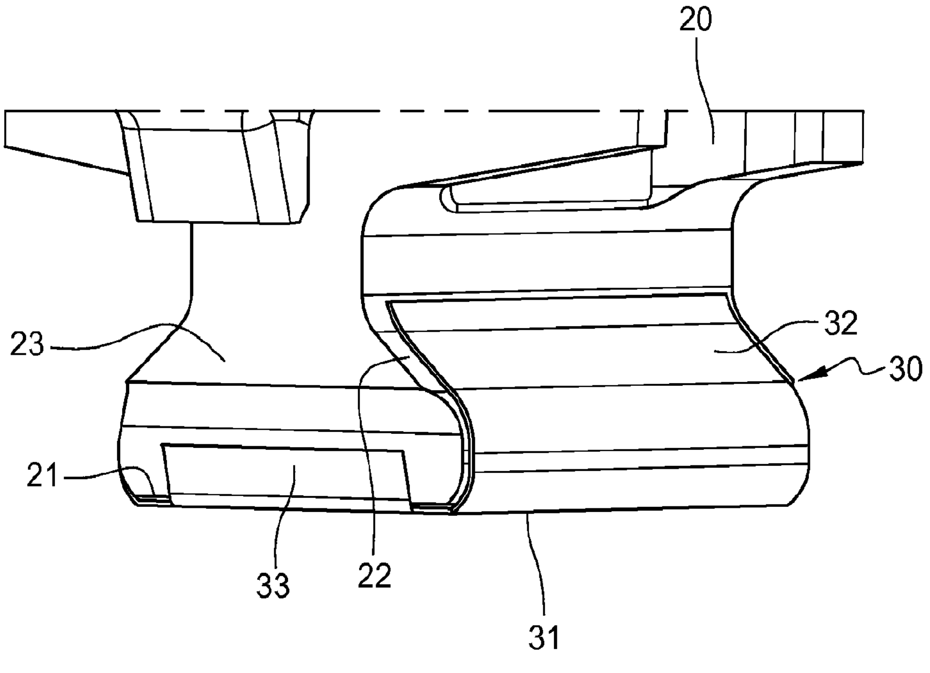
FIG. 2, already described, represents a schematic perspective view of a root of a rotating blade equipped with a foil according to the state of the art.
Figure 3:
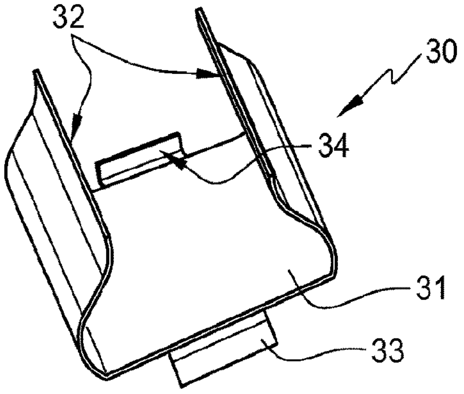
FIG. 3, already described, represents a schematic perspective view of a foil according to the state of the art.
Figure 4:
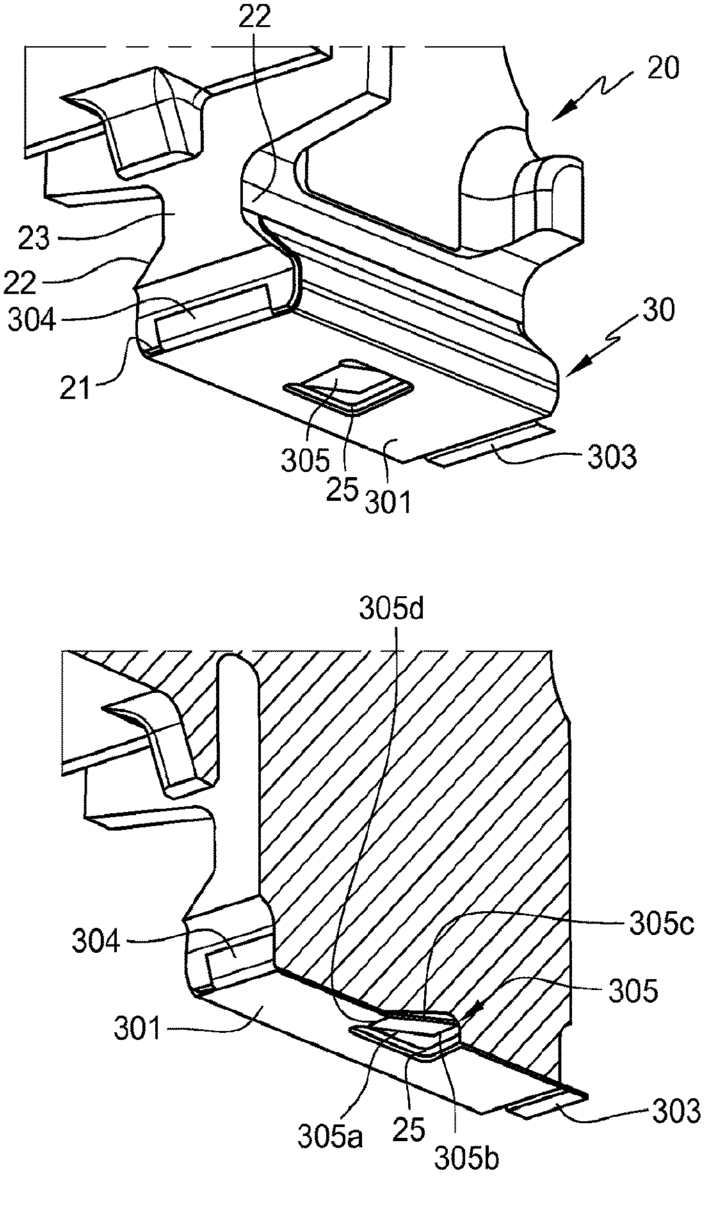
FIG. 4 represents a schematic perspective view (A) and a schematic cross-section view (B) of a blade root equipped with a foil according to the invention.
Figure 5:
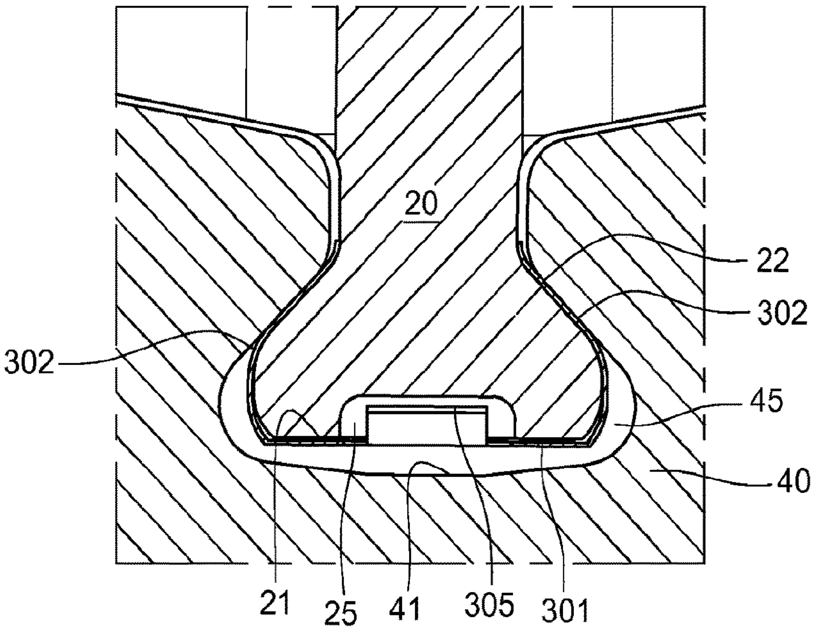
FIG. 5 represents a schematic cross-section front view of a blade root equipped with a foil according to the invention, mounted in a disc alveolus.

One example of a foil in accordance with the invention, mounted around a rotating blade root, is represented in perspective view in part A of FIG. 4 and in cross-section view in part B of FIG. 4. This foil is represented in FIG. 5, in a front cross-section view, mounted around a blade root housed within an alveolus of a rotor disc. This same foil is also represented, in a cross-section view, in FIG. 6.

This foil, referenced 300, is designed to be mounted around a blade root 20, especially at the contact interfaces between said blade root 20 and a cavity 45 of a rotor disc, adapted to receive this blade root. Indeed, as a reminder, each blade root 20 of the rotating blade 10 is engaged in a cavity 45 formed in the outer periphery of the disc 40 and held radially in said cavity by shape cooperation between the blade root 20 and the cavity 45. Generally, the blade root 20 is dovetail-shaped and the cavity 45 of the disc is alveolus-shaped. The blade root 20 of the rotating blade 10 comprises a lower face 21, two lateral flanks 22, an upstream face 23 and a downstream face 24.

Upon rotating the rotor disc 40, the rotating blades 10 are subjected to centrifugal forces and, under the effect of these centrifugal forces, the lateral flanks 22 forming the contact interfaces of the blade roots 20 come into stop against the contact interfaces of the disc cavities 45. A foil 300 is positioned around each rotating blade root, between the contact interface of the blade root and the contact interface of the corresponding cavity of the disc, so as to limit wear of said blade roots.

Like most foils, the foil 300 according to the invention includes an overall U-shaped section formed by two lateral legs 302 connected through a lower surface 301. The lower surface 301 of the foil, or base of the foil, covers the lower face 21 of the blade root 20. The lateral legs 302 each cover at least part of the two lateral sides 22 of the blade root 20.

The foil according to the invention may also comprise radial tabs 303, 304, produced by cutting the lower surface 301 and radially folding along the upstream 23 and downstream 24 faces of the blade root 20. Each of the radial tabs 303, 304 is cut out at one of the free ends of the lower surface 301, that is on one of the sides of the lower surface 301 extending between the two lateral legs 302 of the foil, with a predefined shape, for example rectangular or square, with reduced dimensions compared with the dimensions of the upstream and downstream faces of the blade root. During manufacture of the foil 300 or during assembly of said foil on the blade root 20, each radial tab 303, 304 is folded and bent radially along the upstream face 23 or the downstream face 24 of the blade root so as to form, with the lower surface 301, a substantially right angle. These radial tabs 303, 304 thus form axial stops for limiting relative axial movements between the root 20 and the foil 300.

The foil 300 according to the invention includes one or more oblique tabs 305. This/these oblique tab(s) 305 may be made in addition to the radial tabs 303, 304 to overcome the problem of wear of said radial tabs. If the oblique tab(s) 305 are more resistant than the radial tabs (for example with a different choice of material or a treatment applied to the material), then they can be made instead of said radial tabs. In the remainder of the description, consideration will be given to the alternative in which the oblique tab(s) form a blocking means additional to that formed by the radial tabs.

In examples A and B of FIG. 4, a single oblique tab 305 is represented substantially at the centre of the lower surface 301 of the foil 300. However, a person skilled in the art will understand that a plurality of oblique tabs may be formed in the lower surface 301, symmetrically or asymmetrically distributed in said lower surface, which oblique tabs may all be substantially identical to the oblique tab 305 described thereafter and represented in FIGS. 4, 5 and 6.

The oblique tab 305 is a leaf or lamella partially cut out in the lower surface 301 of the foil and having a contour, a part of which forms a free edge and another part of which forms a non-free edge, attached to said lower surface. The term "free edge" refers to an edge which is detached from the lower surface of the foil, as opposed to the non-free edge which is connected or attached to said lower surface. This leaf or lamella is placed in an oblique position with respect to the lower surface 301 of the foil, that is it extends along a tilted plane, in a position forming an angle that is neither right nor flat with said lower surface 301. The angle formed by the tilted tab 305, with respect to the lower surface 301, may be, for example, between 10° and 25°. Whatever its tilt angle, the oblique tab 305 forms a protrusion in a tilted plane with respect to the lower surface of the foil, this protrusion being designed to be inserted into the blade root, as explained below.

The tilted plane formed by the oblique tab 305 preferably extends in the positive direction of the axis X, that is in the direction of the air flow, from upstream to downstream, this direction being favourable to the placement of the foil on the blade root. Of course, the oblique tab 305 can extend in different directions insofar as the oblique tab blocks the relative movement of the blade root with respect to the foil whatever the direction of said oblique tab.

Figure 8:
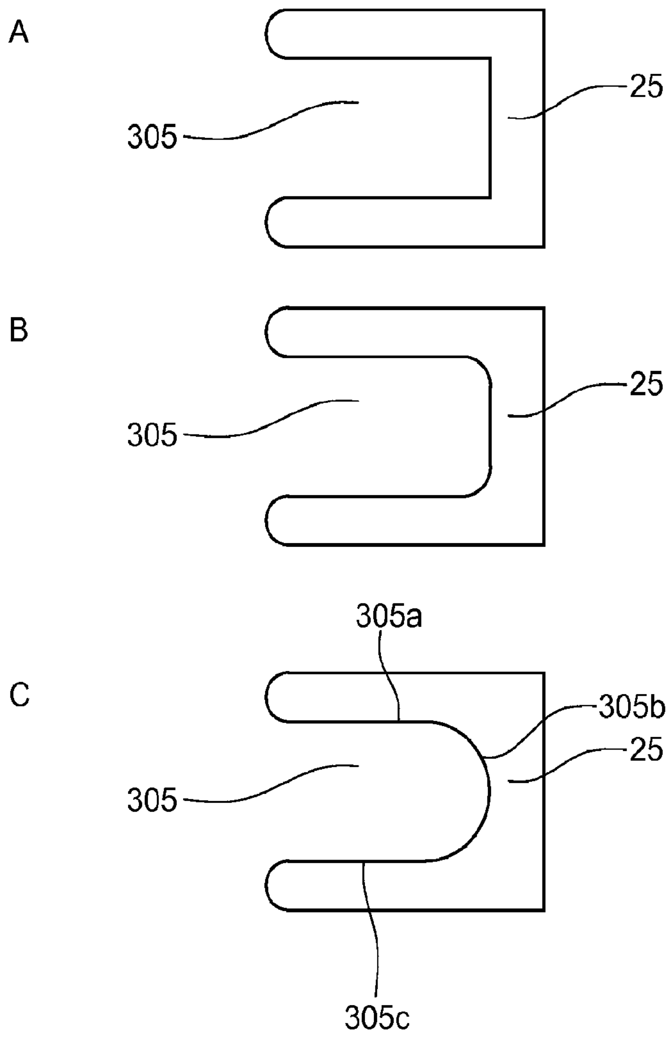
FIG. 8 represents a schematic bottom view of several embodiments of an oblique tab according to the invention.

The oblique tab 305 may, for example, be substantially square or rectangular in shape with three free sides 305*a*, 305*b*, 305*c*, that is sides entirely cut out and therefore not attached to the lower surface 301, and one non-free side 305*d*, i.e. a side at least partly attached to the lower surface 301. FIG. 8 represents several examples of shapes of the optical tab 305. In example A of FIG. 8, the oblique tab 305 is substantially rectangular in shape. In example B of FIG. 8, the oblique tab 305 is substantially rectangular in shape with rounded corners at each angle between two free sides. In example C of FIG. 8, the oblique tab 305 is rounded in shape, with two rectilinear free sides 305*a*, 305*c* and an arc-of-circle free side 305*b*.

Figure 6:
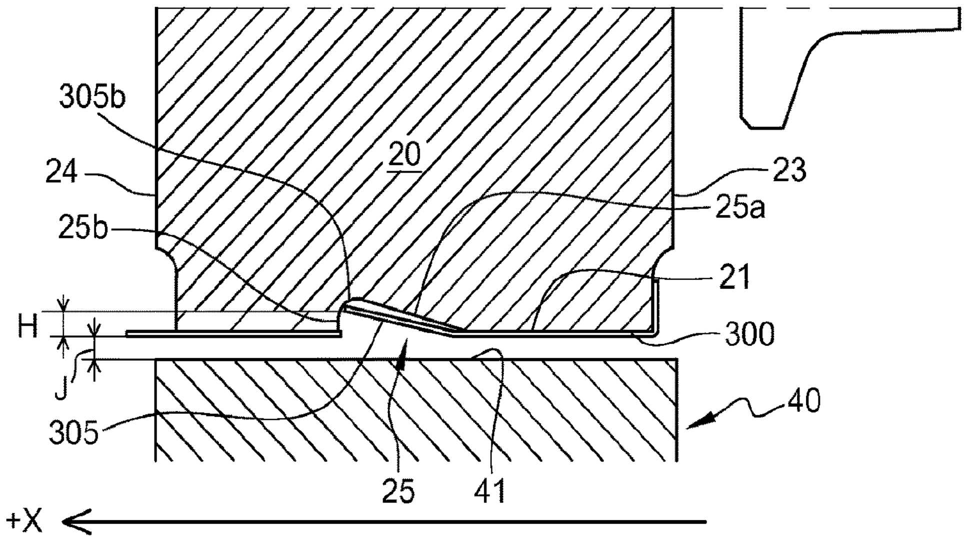
FIG. 6 represents a schematic cross-section side view of a blade root equipped with a foil according to the invention.

The oblique tab 305 is designed to be housed in a recess 25 of the blade root 20. This recess 25 having a shape and dimensions adapted to those of the oblique tab 305 so as to form a housing able to receive said tab. As represented in FIGS. 4 to 6, the recess 25 is a non-through port formed in the lower face 21 of the blade root 20. This recess 25 has sides whose dimensions are identical to or slightly larger than the dimensions of the free sides 305*a*, 305*b*, 305*c* of the oblique tab 305 so as to allow insertion of said tab within said recess. The term "slightly" is understood to be identical with an additional clearance adapted to allow the oblique tab to be folded inside the recess.

The recess 25 may include an oblique upper wall 25*a*, or ceiling, that is tilted at a slope more or less similar to that of the oblique tab 305. In other words, the oblique ceiling of the recess 25 forms a tilted plane, which may be parallel to the tilted plane formed by the oblique tab 305. In the example of FIGS. 4 and 6, the recess 25 is rectangular in shape, with dimensions equal to or slightly greater than those of the oblique tab 305, and its ceiling 25*a* is tilted, with respect to the general surface of the lower face 21 of the blade root 20, by an angle substantially equal to the tilt angle of the oblique tab 305.

According to some embodiments, and in order to ensure completely stable positioning of the foil, the distance or height H between the lower surface 301 of the foil and the free end 305*b* of the oblique tab, in the recess 25, is greater than the distance or clearance J between the lower face 21 of the blade root and the bottom 41 of the alveolus of the disc 40. The free end 305*b* is the free edge of the oblique tab 305 which is furthest from the lower surface 301 of the foil.

In some embodiments, such as that shown in FIG. 6, the downstream wall 25*b* of the recess 25 may be substantially rounded so as to be parallel to the trajectory of the oblique tab 305 as it enters the recess.

In some embodiments, the oblique tab 305 is folded prior to insertion into the recess 25 of the blade root. In particular, after having been cut out of the lower surface 301 of the foil 300, the tab 305 can be made oblique by a folding operation, before mounting the foil to the blade root. During assembly, the oblique tab 305 is able to be inserted, by elasticity, into the recess 25 of the blade root. The foil 300 has some flexibility, especially due to the choice of material (titanium aluminide, for example) and also its thinness (0.08 mm or 0.16 mm, for example). This flexibility allows not only the shaping of the foil around the blade root, but also positioning of the oblique tab 305 in the recess 25 of the blade root. In this way, the oblique tab is folded only once, either when the foil is mounted to the blade root or when the two side legs 302 are drawn. Due to its flexibility, the oblique tab 305 has some spring effect which allows it, when mounted to the blade root, to unfold slightly and, once in the recess 25 of the blade root, to unfold by spring effect.

In some embodiments, the tab 305 may be folded, by human or mechanical action, after the foil 300 has been mounted to the blade root. In these embodiments, it may be advantageous for the top wall 25*a* of the recess to be tilted as this tilt may serve as a stop for the oblique tab during the operation of folding said tab.

In the embodiments described previously, the oblique tab 305 may have a planar cross-section, as represented in the examples of FIGS. 4 and 6. In these embodiments, the oblique tab, in a cross-section view, is rectilinear.

Figure 7:
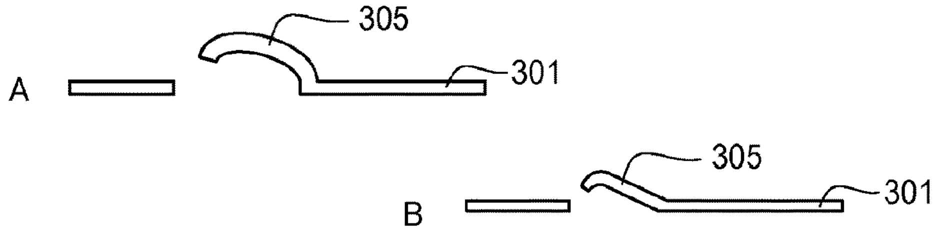
FIG. 7 represents a schematic cross-section view of one embodiment of the oblique tab of the foil according to the invention.

In other embodiments, the oblique tab 305 may have a curved or convex profile, as represented in the examples of FIG. 7. In these embodiments, the oblique tab 305 may have a radius of curvature along its entire length (example of part A in FIG. 7) or along only part of its length, the other part being planar (example of tab B in FIG. 7). In one alternative, the oblique tab 305 can be domed, that is part of its surface area has the shape of a half-sphere. In these embodiments, the oblique tab is shaped by drawing.

Although described through a number of examples, alternatives and embodiments, the foil for a rotating blade according to the invention comprises various alternatives, modifications and improvements which will be obvious to the person skilled in the art, it being understood that these alternatives, modifications and improvements are within the scope of the invention.

The invention claimed is:

1. A foil for a rotating blade of a turbomachine, configured to be mounted to a blade root of said rotating blade and comprising:

an overall U-shaped cross-section formed by two lateral legs connected through a lower surface, the lower surface covering a lower face of the blade root, the lateral legs each covering at least part of two lateral flanks of the blade root; and blocking means for prohibiting at least some relative movements between the blade root and said foil, said blocking means including at least one oblique tab, partially cut out of a lower surface of the foil and forming, with respect to said lower surface of the foil, a tilted plane protrusion able to be inserted into a housing formed in a lower face of the blade root, wherein the tilted plane formed by the oblique tab extends, starting from the lower surface of the foil, from an upstream to downstream direction of airflow in the turbomachine, and wherein the foil comprises radial tabs cut out at free ends of the lower surface, each of the radial tabs radially folding along either an upstream face or a downstream face of the blade root such that the radial tabs are present on both the upstream and downstream face and form axial stops limiting relative axial movements between the blade root and the foil, said radial tabs having reduced dimensions compared to dimensions of the upstream and downstream faces of the blade root.

2. The foil according to claim 1, wherein the oblique tab includes free edges detached from the lower surface of the foil, and a non-free edge attached to said lower surface.

3. The foil according to claim 1, wherein the oblique tab is at least partially rectangular in shape and is tilted relative to the lower surface of the foil at an angle of less than 45°.

4. The foil according to claim 3, wherein the oblique tab is tilted, relative to the lower surface of the foil, at an angle of between about 10° and 25°.

5. The foil according to claim 1, wherein the oblique tab has the shape of a planar lamella, shaped by folding its non-free edge.

6. The foil according to claim 1, wherein the oblique tab has the shape of a lamella with an at least partially bent profile, shaped by drawing.

7. An assembly for a turbomachine rotor, including a rotating blade configured so as to be rotatably rotating about an axis of rotation and including a vane radially extending between a heel and a blade root, said blade root including a lower face extending in a plane parallel to the axis of rotation, the assembly comprising a foil according to claim 1, mounted at least partially around the blade root, the lower face of the blade root including a recess forming a housing for the oblique tab of the foil.

8. The assembly according to claim 7, wherein the blade root is configured so as to be mounted in an alveolus of a disc of the turbomachine, wherein a height between the lower surface of the foil and free edge of the oblique tab furthest from said lower surface is greater than a clearance between the lower face of the blade root and a bottom of the alveolus of the disc.

9. The assembly according to claim 7, wherein the recess of the blade root includes an oblique upper wall forming a tilted plane substantially parallel to the tilted plane formed by the oblique tab.

10. A turbomachine including a rotor comprising at least one assembly according to claim 7.

* * * * *